United States Patent [19]
Byron

[11] Patent Number: 4,793,680
[45] Date of Patent: Dec. 27, 1988

[54] INDUCED GRATING DEVICES AND METHOD OF MAKING SAME

[75] Inventor: Kevin C. Byron, Bishop's Stortford, Great Britain

[73] Assignee: STC PLC, London, England

[21] Appl. No.: 52,284

[22] Filed: May 21, 1987

[51] Int. Cl.[4] .......................... G02B 6/34; G02B 5/18
[52] U.S. Cl. .............................. 350/96.19; 350/96.15; 350/320; 350/162.2; 350/162.21; 350/162.23
[58] Field of Search ............... 350/96.11, 96.12, 96.13, 350/96.14, 96.15, 96.17, 96.19, 96.20, 96.29, 96.30, 320, 162.16, 162.17, 162.19, 162.2, 162.23, 162.21, 162.24

[56] References Cited

U.S. PATENT DOCUMENTS

| | | | |
|---|---|---|---|
| 4,286,838 | 9/1981 | Huignard et al. | 350/96.11 |
| 4,400,056 | 8/1983 | Cielo | 350/96.19 X |
| 4,403,827 | 9/1983 | Bryan et al. | 350/320 X |
| 4,540,244 | 9/1985 | Sincerbox | 350/162.2 X |
| 4,560,249 | 12/1985 | Nishiwaki et al. | 350/162.2 X |
| 4,622,663 | 11/1986 | Ishikawa et al. | 350/96.19 X |
| 4,673,241 | 6/1987 | Nishiwaki et al. | 350/96.14 |
| 4,707,059 | 11/1987 | Ogura et al. | 350/96.19 X |
| 4,725,110 | 2/1988 | Glenn et al. | 350/96.19 |
| 4,728,165 | 3/1988 | Powell et al. | 350/162.2 X |
| 4,737,007 | 4/1988 | Alferness et al. | 350/96.19 |
| 4,750,801 | 6/1988 | Alferness | 350/96.12 |

FOREIGN PATENT DOCUMENTS

| | | | |
|---|---|---|---|
| 1558689 | 1/1980 | United Kingdom | 350/96.10 |
| 2131417 | 6/1984 | United Kingdom | 350/320 X |

OTHER PUBLICATIONS

Tien, "Method of Forming Novel Curved-Line Gratings . . . " Optics Lett. vol. 1, No. 2, 8/77 pp. 64–66.
Yin et al., "Photoinduced Grating Filters . . . Waveguides" Applied Optics vol. 22, No. 24, 12/83 pp. 4088–4092.
Applied Phys. Lett. 47(3), 1 Aug. 1985 "Laser Photochemical Fabrication of Phase-Controlled 160-nm Period Gratings by Stimulated Second-Coder Surface Plasma Wave Scattery" D. J. Ehrlich et al.
The American Physical Society, vol. 26, No. 2, 15 Nov. 1982 Physical Review B. "Growth of Spontaneous Periodic Surface Structures on Solids During Laser Illumination", Z. Gvoshery et al.

*Primary Examiner*—William L. Sikes
*Assistant Examiner*—Brian M. Healy
*Attorney, Agent, or Firm*—Lee & Smith

[57] ABSTRACT

It has been found that when a pulsed high-power laser beam is incident on the surfaces of a wide variety of materials, ripples are produced on such surface. This is due to interference between scattered waves and the incident beam producing intensity fringes, and hence localized heating. The dimensions of the ripples are dependent on the wavelngth of the incident light. This is used to produce permanent (after cooling) gratings on the outer surface of an optical waveguide, for example an optical fibre, on to which a laser beam is focussed by a lens system. Hence a grating whose length is a few hundreds of micrometers is produced. If the cladding is removed this effect of ripple generation is enhanced.

9 Claims, 1 Drawing Sheet

INDUCED GRATING DEVICES AND METHOD OF MAKING SAME

BACKGROUND OF THE INVENTION

This invention relates to the production of gratings on the outer surfaces of optical waveguides. Waveguides, particularly but not exclusively optical fibres, with gratings can be used to make various useful optical devices such as frequency selectors for semiconductor lasers.

In recent years it has been widely reported that spontaneous periodic structures or ripples have been observed after the illumination of metals, semiconductors, and dielectrics by intense laser pulses. This is due to one or more Fourier components of a random surface disturbance scattering light from an incident beam very nearly along the surface. The interference of this diffracted optical wave with the incident beam gives rise to optical interference fringes which can reinforce the original disturbance. Sinusoidal corrugations on either metallic or molten surfaces are found to provide positive feedback for ripple growth.

An object of the invention is to provide a method, using the above phenomenon to produce gratings on waveguides.

SUMMARY OF THE INVENTION

According to one aspect of the invention there is provided a method of producing a grating on an outer surface of an optical waveguide, which includes focussing a light beam from a laser on to the outer surface of the waveguide so that a region of that waveguide surface is illuminated, the light beam having a power such as to generate a succession of ripples on said region, which succession of ripples form an optical grating, wherein the spacing of said ripples is determined by the wavelength of the incident light from the laser.

According to another aspect of the invention there is provided an apparatus for producing a grating on an outer surface of a cylindrical optical fibre, which includes a laser which when in use generates a high-power pulsed beam of light at a writing wavelength, means to support an optical fibre on the outer surface of which a grating is to be produced after the cladding of the fibre has been etched away at the region at which the grating is required, and a lens system which when the apparatus is in use focusses the laser beam on to the cylindrical region at which the grating is to be written, the arrangement being such that the laser beam produces a region of closely adjacent ripples which define the grating, the dimensions of said ripples being defined by the wavelength of the incident light.

According to a further aspect of the invention there is provided an apparatus for producing a grating on an outer surface of an optical waveguide, which includes a laser which when in use generates a high-power pulsed beam of light at a writing wavelength, means to support the optical waveguide on the surface of which a grating is to be produced, and a lens system which when the apparatus is in use directs the laser beam onto said surface, the arrangement being such that the laser beam produces a region of closely adjacent ripples which define the grating, the dimensions of said ripples being defined by the writing wavelength.

According to yet another aspect of the invention there is provided a method of producing a grating on the outer surface of a cylindrical optical fibre, which includes etching the cladding of the fibre away at the region thereof at which the grating is to be produced, and focussing the light beam from a laser on to the outer surface of the fibre from which the cladding has been etched away, so that a region of the said outer surface of the fibre is illuminated, wherein the light beam has a power such as to generate a succession of ripples on said region, which succession of ripples forms an optical grating, and wherein the spacing of the ripples is determined by the wavelength of the incident light from the laser, the said etching the cladding away serving to enhance the effect of ripple generation.

BRIEF DESCRIPTION OF THE DRAWINGS

Embodiments of the invention will now be described with reference to the accompanying drawings, in which.

DESCRIPTION OF THE PREFERRED EMBODIMENT

Figure 1:
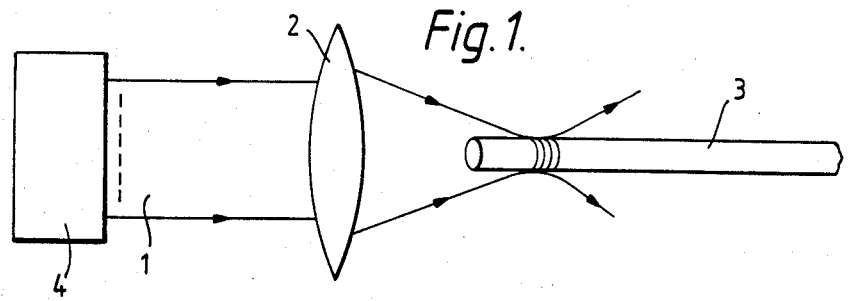
FIG. 1 illustrates, highly schematically, focussing light onto the outer surface of an optical fibre waveguide to produce a grating thereat.

In FIG. 1, we see a beam of light 1, which may be pulsed, from a laser 4 focussed by a lens system represented by a single convex lens 2 on to the outer surface of a region near the end of an optical fibre waveguide 3. As a result a series of adjacent ripples are produced on the optical fibre whose spacing is dependent on the wavelength of the incident light. With the materials normally used for optical fibres the ripple spacing is found to approximate to the wavelength of the light. Hence by suitable choice of that wavelength, ripples of the required spacing can be generated.

The ripple production appears to be due to the production of light waves along the surface of the work piece (optical fibre waveguide), caused by scattering of the incident wave due to some discontinuity on the surface of the work piece. Even with nominally smooth surfaces there are enough discontinuities, i.e. discontinuities as "seen" by the usually very short wavelength light, to cause such scattering. However, if this is not the case, an initial or "seed" discontinuity can be provided at the region at which the grating is to be made.

The scattered waves thus produced then interfere with the incident beam to generate intensity fringes which cause coresponding localised heating of the surface of the work piece, and corresponding melting of the surface resulting, after cooling, in alternating regions of different properties and this forms the grating. Thus the grating is permanently written on the surface of the work piece.

With the arrangement shown in FIG. 1, the grating is "written" over the length of the beam where it acts on the outer surface of the fibre. This can be a length of the order of a few hundred microns; greater lengths of grating can be made by suitable movement of the fibre with relation to the lens system.

The effect described above is enhanced if the optical fibre's cladding is previously etched away in the region at which the grating is to be produced.

The wavelength of light $\lambda_p$ used to write the grating is given by $$\lambda_p = m\lambda_o/2n$$

where
m in an integer;
$\lambda_o$ is the wavelength in air at which the arrangement is to be used, and
n is the refractive index of the fibre.

For example, for a grating to be used at 1.5 μm, given that n=1.45 and m=1, the writing wavelength $\lambda_p$ is 0.517 μm.

The applied light can be either high intensity short (e.g. picosecond) pulses, or repeated lower intensity pulses.

Thus we have a convenient and simple method of generating optical gratings on the outer surface of an optical fibre. This enables a number of components useful in optical systems, e.g. a frequency selector for a semiconductor laser, to be produced.

Figure 2:
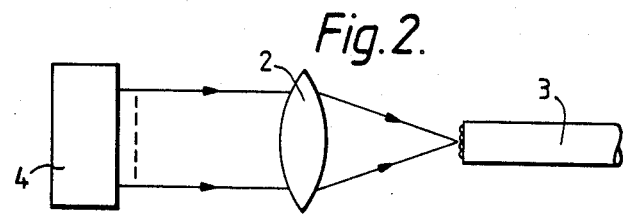
FIG. 2 illustrates, highly schematically, producing a grating on the flat end of an optical fibre waveguide.
Figure 3:
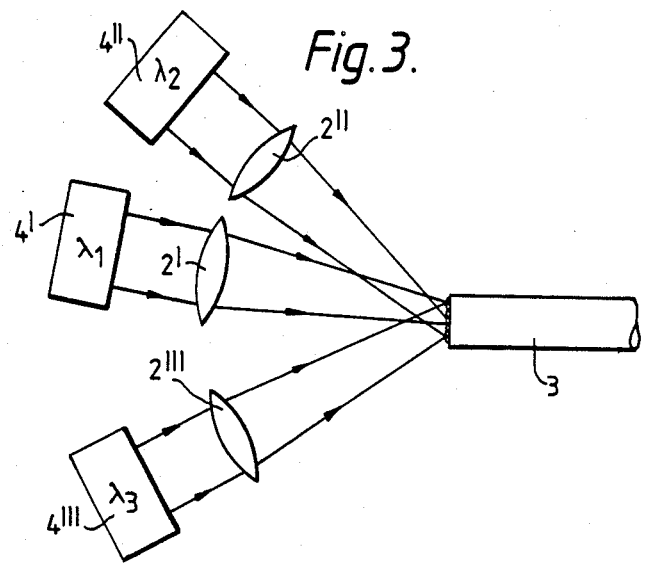
FIG. 3 illustrates a use of a grating on the flat end of an optical fibre waveguide.

The principle can be extended to the application of a grating to the flat end of an optical fibre, as can be seen in FIG. 2. In FIG. 2 the writing of a grating on to the flat end of the fibre is illustrated. Such a grating can be used to multiplex the fibre as illustrated in FIG. 3. Beams from slightly different lasers 4', 4" and 4''' (different wavelengths) are launched at different angles (determined by the grating condition) into the fibre end.

Figure 4:
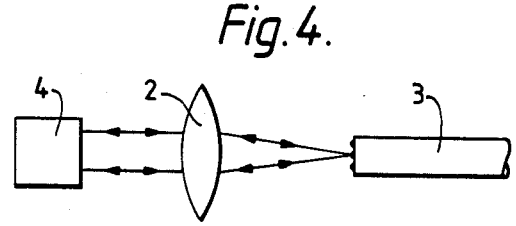
FIG. 4 illustrates use of a grating on the flat end of an optical fibre waveguide.

FIG. 4 shows an arrangement in which a grating on the flat end of the optical fibre 3 is used to reflect the beam back to the laser 4. This enables line narrowing of the laser to be achieved.

Whilst the invention has been particularly described with respect to the writing of a grating on an optical fibre waveguide it is not to be considered as so limited. Such gratings can alternatively be written on the surface of other forms of waveguides, for example integrated optic waveguides, in which case element (fibre 3 of FIG. 2) can be considered to be part of an integrated optic waveguide structure rather than a fibre.

I claim:

1. A method of writing a permanent optical grating at an outer surface of an optical fibre, which method includes focussing a light beam from a laser on to the outer surface of the fibre so that a region of that surface is illuminated, the light beam having a power such as to generate a succession of ripples at said region, which succession of ripples comprises the permanent optical grating, interference between the light beam as incident on the surface and the light beam as scattered by the surface causing intensity fringes which correspondingly locally heat and melt the surface and result, after cooling, in the ripples, the spacing of said ripples being determined by the wavelength of the incident light from the laser.

2. A method as claimed in claim 1, wherein the optical fibre has a circular cross-section and the grating is written on an outer cylindrical surface of the fibre.

3. A method as claimed in claim 2, wherein the optical fibre has cladding which is etched away from the fibre prior to said illumination, thereby enhancing the effect of ripple generation.

4. A method as claimed in claim 1, wherein the grating is produced on a flat end face of the optical fibre.

5. Apparatus for writing a permanent optical grating at an outer surface of a cylindrical optical fibre, which apparatus includes a laser which when in use generates a high-power pulsed beam of light at a writing wavelength, means to support an optical fibre at the outer surface of which the grating is to be produced after cladding of the fibre has been etched away at a region at which the grating is required, and a lens system which when the apparatus is in use focusses the laser beam on to the cylindrical region at which the grating is to be written, the arrangement of the apparatus being such that in use the laser beam produces a region of closely adjacent ripples which define the grating due to interference between the laser beam as incident on the outer surface and the laser beam as scattered by the outer surface, which interference causes intensity fringes that locally heat and melt the outer surface and result, after cooling, in the ripples, the dimensions of said ripples being defined by the wavelength of the incident laser beam.

6. A method of writing a permanent optical grating on the outer surface of a cylindrical optical fibre, which method includes etching cladding of the fibre away at a region thereof at which the grating is to be written, and focussing a light beam from a laser on the outer surface of the fibre from which the cladding has been etched away, so that a region of the outer surface of the fibre is illuminated, wherein the light beam has a power such as to generate a succession of ripples at said region, which succession of ripples forms the permanent optical grating, interference between the light beam as incident on the outer surface and the light beam as scattered by the outer surface causing intensity fringes which correspondingly locally heat and melt the surface and result, after cooling, in the ripples, and wherein the spacing of the ripples is determined by the wavelength of the incident light beam from the laser, the said etching the cladding away serving to enhance the effect of ripple generation.

7. A method of writing a permanent optical grating at an outer surface of an optical fibre, including the steps of focussing a light beam from a laser on to the outer surface of the optical fibre, interference between the light beam as incident on the surface and the light beam as scattered by the surface causing intensity fringes which locally heat and melt corresponding regions of the surface; removing the light beam and allowing the locally melted surface regions to cool, the resultant structure being a succession of ripples constituting the permanent optical grating, the spacing of said ripples being determined by the wavelength of the light beam.

8. A method as claimed in claim 7 further including the step of causing relative movement between the light beam and the outer surface of the fibre whereby to increase the length of the grating produced.

9. A method as claimed in claim 7 wherein the wavelength of the light beam ($\lambda_p$) is related to the wavelength in air at which the grating is to be used ($\lambda_o$) by the expression $\lambda_p = (m\lambda_o)/n$, where m is an integer and n is the refractive index of the fibre.

* * * * *